Jan. 30, 1945.　　　　　N. RAYNE　　　　　2,368,324
DENTAL HANDPIECE
Filed Jan. 27, 1943
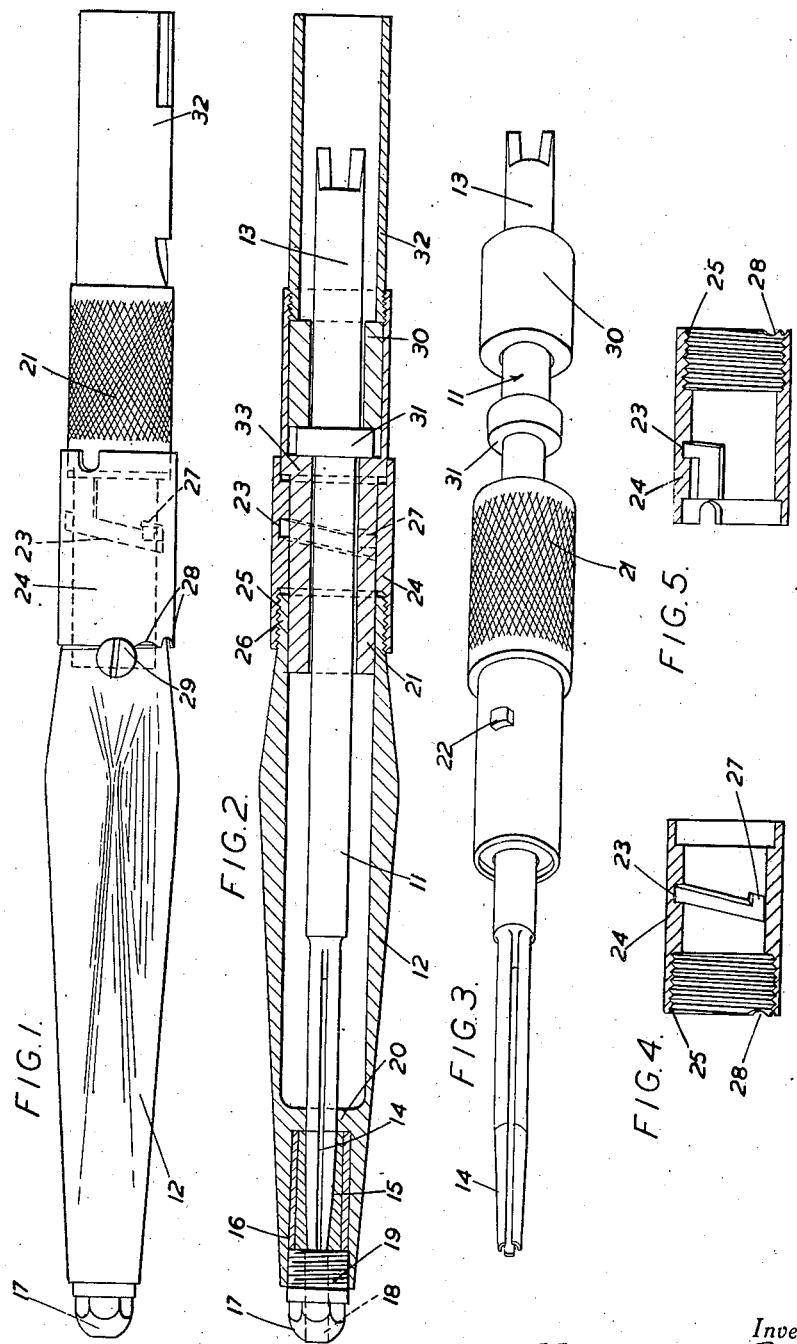
Inventor
Norman Rayne
By
Spear, Donaldson & Hall
Attorney Patented Jan. 30, 1945

2,368,324

UNITED STATES PATENT OFFICE 2,368,324

DENTAL HAND PIECE

Norman Rayne, London, England

Application January 27, 1943, Serial No. 473,747
In Great Britain February 13, 1942

7 Claims. (Cl. 279—51)

This invention relates to dental handpieces, that is to say handpieces adapted to hold and transmit rotary motion to the burrs used by dental surgeons in such operations as the excavating of decayed teeth.

The dental handpieces in use prior to the present invention are complicated pieces of apparatus. In the assembling or disassembling of these prior devices it has been necessary to use a tool, or tools, and because of the intricate nature of the mechanism the process is best carried out by an instrument-maker or skilled mechanic, and cannot be entrusted to a dental assistant or other unskilled person. Moreover, because of the nature and functioning of the parts it is necessary that the mechanism be plentifully supplied with lubricating oil. The difficulty of dismantling and reassembling the prior types of dental handpieces and the need for oil lubrication make it impossible for a dental operator to effect quick and thorough sterilization of a handpiece. In ordinary circumstances there is not time for dismantling. Moreover, the instrument cannot be boiled or soaked in an antiseptic solution since such steps would destroy or remove the lubricating film.

An object of the invention is to provide an improved dental handpiece, and particularly to provide a handpiece that comprises only about half the customary number of component parts, and can be easily and quickly disassembled and reassembled by any ordinarily intelligent person, without tools, and can be thoroughly sterilized without detriment to lubrication.

A dental handpiece exhibiting the invention comprises a spindle rotatably supported in a casing, one end of the said spindle being adapted to be suitably attached to a driving shaft and the other end thereof being tapered and hollowed and split to form a chuck, an interiorly coned socket being provided to co-operate with the said chuck, the said coned socket being so associated with the said casing as to be closely restricted in respect of its moving longitudinally of the said spindle and casing and being bored with a taper corresponding to the taper of the chuck, the chuck and the coned socket being so formed that the chuck by being pushed into the coned socket can be made to close to grip the shank of a dental burr if the said shank is placed within the chuck, or to open again by being pulled out of the coned socket, the coned socket being formed with a cylindrical exterior peripheral surface which is arranged to bear upon the inner surface of a forward cylindrical bearing suitably provided within the casing, and means being provided for urging the spindle to move longitudinally so that the chuck is pushed into or pulled out of the coned socket.

Other features of the invention will be particularly described hereinafter, and will be set forth in the appended claims.

In order that the invention may be clearly understood and readily carried into effect, one embodiment thereof will now be fully described with reference to the accompanying drawing, in which:

Figure 1 represents in elevation (enlarged) a dental handpiece according to the invention;

Figure 2 represents the same in sectional elevation;

Figure 3 represents in perspective certain component parts; and

Figures 4 and 5 provide two views in sectional elevation of a single component part.

In the embodiment illustrated, a spindle generally indicated by the reference numeral 11 is rotatably supported in a casing 12. One end 13 of the spindle 11, which end may be called the rear end, is adapted to be suitably attached in known manner to a driving shaft, such as one of the flexible shafts commonly used in connection with dental handpieces. The other or forward end of the spindle 11 is tapered, hollowed and split to form a chuck 14. An interiorly coned socket 15 is provided to co-operate with the chuck 14, being bored with a taper corresponding to the taper of the latter, the chuck 14 and the coned socket 15 being so formed that the chuck 14 by being pushed into the coned socket 15 can be made to close to grip the shank of a dental burr if the said shank is placed within the chuck 14, or to open again by being pulled out of the coned socket 15.

The coned socket 15 is formed with a cylindrical exterior peripheral surface, which is arranged to bear upon the inner surface of a forward cylindrical bearing 16 which the casing 12 is suitably formed to receive. The forward cylindrical bearing 16 is preferably of the kind commonly referred to as "self-oiling," being of composite material impregnated with a suitable solid lubricant, such as graphite, grease or the like, so that this bearing is self-lubricating.

A perforated closure nozzle 17 is provided at the forward end of the casing 12, the nozzle 17 being perforated with a bore 18 concentric with the axis of the chuck 14, and having an externally screw-threaded part 19 threaded in the end of the casing 12. An equivalent closure might be constructed as a screw-on cap.

The coned socket 15 is closely limited in respect of longitudinal movement in that its inner end is arranged to abut upon an interiorly projecting annular flange 20 provided within the casing 12 and preventing the coned socket 15 from moving past it rearwardly, whilst the outer end of the coned socket 15 abuts upon the nozzle 17 which prevents the coned socket 15 from moving forwardly. Enough longitudinal play is, however, allowed the coned socket 15 to provide that it shall be freely revolvable.

Means for urging the spindle 11 longitudinally so that the chuck 14 is pushed into or pulled out of the coned socket 15 comprise a control sleeve 21 adapted to be revolved in relation to the casing 12. The control sleeve 21 carries a bayonet pin 22 (Figure 3) adapted to engage with a bayonet groove 23 of helical or approximately helical form provided in an extension sleeve 24 and rigidly attached to the casing 12 by being provided at its forward end with interior screw-threads 25 by means of which the extension sleeve 24 can be screwed upon an exteriorly screw-threaded portion 26 at the rear end of the casing 12. By means of the screw-threaded relationship thus provided, the extension sleeve 24 is longitudinally adjustable upon the casing 12.

The formation of the bayonet groove 23 is indicated in Figures 1 and 2, but is shown more clearly in Figures 4 and 5. The bayonet groove 23 at the forward end of its course is formed with a small notch or recess 27 extending rearwardly, to provide that after the bayonet pin 22 has progressed relatively to the bayonet groove 23 and the casing 12 to the point at which it is nearest the chuck, then if it progresses slightly further in the bayonet groove 23 it is given room to recede slightly away from the chuck, by reason of its entering the notch 27. This arrangement provides that when by means of the control sleeve 21 the spindle 11 is moved forwardly, sufficient thrust can be applied to force the chuck 14 into the coned socket 15 so as to close the chuck, but by a slight further similar movement of the control sleeve 21 the compressive effect of this thrust is released so that the coned socket 15 can recede slightly to avoid being subjected to excessive friction tending to hinder its revolution.

In order to secure the extension sleeve 24 in rigid attachment to the casing 12, suitable means are provided to lock the extension sleeve 24 in a chosen position in relation to the casing 12, as by a small screw joining these parts together. In the present embodiment the extension sleeve 24 is provided at its forward edge with several circumferentially arranged notches 28 with one of which engages the head of a small screw 29 fixed radially in the casing 12. The screw 29 when engaging with one of the notches 28 prevents the extension sleeve 24 from revolving in relation to the casing, but is adapted to engage with different notches so as to allow of slight angular and longitudinal adjustment of the extension sleeve 24. The longitudinal adjustment thus obtainable makes possible a very fine adjustment of the extent to which the chuck 14 enters into the coned socket 15 when the control sleeve 21 is operated to effect this movement of the chuck 14.

The spindle 11 near its end 13 is supported in a rear bearing 30 which is associated with the casing 12 by being housed within the rear end of the control sleeve 21. The bearing 30 is impregnated with a lubricant so as to be self-lubricating. The rear bearing 30 abuts forwardly upon a flange 31 provided on the spindle 11, and the rear end of the control sleeve 21 is interiorly screw-threaded to receive the forward end, correspondingly exteriorly screw-threaded, of an end ferrule 32 which is adapted to co-operate in the attaching of the spindle 11 by its rear end 13 to a driving shaft, which end ferrule 32 when screwed home in the control sleeve 21 abuts with its forward end upon the rear end of the rear bearing 30. The arrangement is such that if the control sleeve 21 is so revolved that it is moved forwardly, i. e. in the direction of the chuck 14, it carries with it the end ferrule 32, which accordingly pushes upon the rear bearing 30, which in turn pushes upon the flange 31, and the spindle 11 is thus moved longitudinally so that the chuck 14 can be pushed towards the coned socket 15.

The control sleeve 21 is so formed that a part of its interior constitutes an inwardly projecting shoulder 33 (Figure 2) which is arranged to abut upon the forward side of the flange 31. Thus if the control sleeve 21 is so revolved that it moves rearwardly it pushes upon the flange 31, and the spindle 11 is thus moved longitudinally so that the chuck 14 can be pulled out of the coned socket 15.

The invention is readily applicable to the production of straight handpieces. It is, however, not confined to this field, but is also applicable to handpieces embodying any angular conformation. It will be obvious that the length of a handpiece as illustrated in the drawing could easily be considerably reduced, particularly in respect of the casing 12; moreover it would not be difficult to modify and extend the end ferrule 32 so that the complete handpiece comprised two straight portions meeting at any desired angle.

What I claim and desire to secure by Letters Patent of the United States is:

1. A dental handpiece comprising, an elongated casing, a one-part spindle extending lengthwise within said casing with one end adapted to be attached to a driving shaft, a conical portion at the other end of said spindle being hollow and split to form a chuck, an internal annular flange carried by and within said casing, a removable member at the end of the casing having a bore therein aligned with said spindle, a cylindrical bearing within the casing between said flange and said removable member, a socket member rotatable within said bearing and maintained against material movement longitudinally of the casing by said flange and said removable member, said socket member having an internal conical surface corresponding to the taper of said spindle, and manually operable means for positively moving said spindle into said socket member and for positively moving the spindle way from said socket member.

2. A dental handpiece comprising, an elongated casing, a spindle extending lengthwise within said casing, a conical portion at one end of said spindle being hollow and split to form a chuck, an internal annular flange carried by and within said casing, a removable member at the end of the casing and having a bore therein aligned with said spindle, a cylindrical bearing impregnated with a lubricant mounted within the casing between said flange and said removable member, a socket member rotatable within said bearing and maintained against material movement longitudinally of the casing by said flange and said removable member, said socket member having an internal conical surface corresponding to the taper of said spindle, and manually operable means for positively moving said spindle into said socket member and for positively moving the spindle away from said socket member.

3. A dental handpiece comprising, an elongated casing, a spindle extending lengthwise within the casing, a conical outer portion at one end of said spindle and being hollow and split to form a chuck, an internal annular flange carried by and within said casing, a closure nozzle threaded within the end of said casing and having a bore aligned with the axis of the chuck, a cylindrical bearing mounted within the casing between said flange and said closure nozzle, a socket member rotatable within said bearing with one end thereof adapted to abut against said flange and the other end of said socket member being adapted to abut against said closure nozzle, said socket member having conical shaped internal surface corresponding to the conical shape of said spindle, and manually operable means for positively moving said spindle into said socket member and for positively retracting the spindle from within said socket member.

4. A dental handpiece comprising, an elongated casing including a sleeve adjustable lengthwise of the casing, a spindle extending lengthwise within said casing and sleeve, a conical portion at one end of said spindle and being hollow and split to form a chuck, an internal annular flange within said casing, a removable member at the end of the casing and having a bore therein aligned with said spindle, a cylindrical bearing within the casing between said flange and said removable member, a socket member rotatable within said bearing and maintained against material movement longitudinally of the casing by said flange and said removable member, said socket member having an internal conical surface corresponding to the taper of said spindle, a control sleeve rotatable with respect to said casing and the first sleeve, said first sleeve having a substantially helically arranged groove formed on the inner surface thereof, a bayonet pin carried by said control sleeve operable within said groove, and means associated with the control sleeve for positively moving the spindle longitudinally of the casing upon rotation of the control sleeve with respect to the casing.

5. A dental handpiece comprising, an elongated casing, a sleeve adjustably secured to the casing, a spindle extending lengthwise within said casing and said sleeve, a conical portion at one end of said spindle being hollow and split to form a chuck, an internal annular flange carried by and within said casing, a removable member at the end of the casing having a bore therein aligned with said spindle, a cylindrical bearing within the casing between said flange and said removable member, a socket member rotatable within said bearing and maintained against material movement longitudinally of the casing by said flange and said removable member, said socket member having an internal conical surface corresponding to the taper of said spindle, a control sleeve rotatable with respect to said casing, the first sleeve having an approximate helical groove formed on the inner surface thereof, a bayonet pin carried by said control sleeve operable within said groove, means associated with the control sleeve for positively moving the spindle longitudinally of the casing upon rotation of the control sleeve with respect to the casing, said first sleeve having a longitudinally extending notch therein at one end of said helical groove whereby the bayonet pin may enter said notch to slightly retract the spindle from said socket member.

6. A dental handpiece comprising, an elongated casing including a sleeve threaded thereon adjacent one end of the casing, a spindle extending lengthwise within said casing, a conical end portion on said spindle and being hollow and split to form a chuck, a cylindrical bearing within the casing adjacent said conical portion of the spindle, a socket member rotatable within said bearing and having an internal conical surface corresponding to the taper of said spindle, said sleeve having a substantially helical groove formed in the inner annular surface thereof, a control sleeve extending within said first mentioned sleeve, a bayonet pin on the control sleeve engaging the first sleeve within said helical groove, means associated with the control sleeve for moving the spindle longitudinally of the casing upon rotation of the control sleeve relative to the casing, a plurality of circumferentially spaced openings in the first sleeve, and means carried by the casing for engaging the first sleeve in one of said openings.

7. A dental handpiece comprising, an elongated casing, a spindle arranged lengthwise within the casing, a conical portion at one end of the spindle being hollow and split to form a chuck, a bearing within the casing adjacent said conical portion, a socket member rotatable within said bearing and having an internal conical surface corresponding to the taper of said spindle, a sleeve forming an extension of said casing, said sleeve having a substantially helical groove therein, a control sleeve including a shouldered portion mounted within the first sleeve, a bayonet pin carried by the control sleeve for engaging the first sleeve within said groove, a flange on said spindle adjacent said shoulder, a bearing for the spindle mounted within said control sleeve and abutting said flange, and a ferrule member secured to the control sleeve abutting the other end of said bearing.

NORMAN RAYNE.